July 6, 1937. W. W. SLOANE 2,086,243
KERF CUTTING MACHINE
Original Filed Oct. 4, 1935  5 Sheets-Sheet 3

Witness:
Inventor:
William W. Sloane
Clarence F. Poole
Attorney

July 6, 1937.　　　　　W. W. SLOANE　　　　　2,086,243
KERF CUTTING MACHINE
Original Filed Oct. 4, 1935　　　5 Sheets-Sheet 5

Witness:
Erwin C. Lange

Inventor:
William W. Sloane
Clarence F. Poole
Attorney

Patented July 6, 1937

2,086,243

UNITED STATES PATENT OFFICE 2,086,243

KERF-CUTTING MACHINE

William W. Sloane, Chicago, Ill., assignor to Goodman Manufacturing Company, Chicago, Ill., a corporation of Illinois Application October 4, 1935, Serial No. 43,470
Renewed December 2, 1936

22 Claims. (Cl. 262—28)

This invention relates to improvements in kerf-cutting machines and more particularly to an improved means for indicating the position of the cutter bar with respect to the coal face when sumped thereunder.

In kerf-cutting machines of the bottom cutting type, wherein the cutter bar is pivotally movable about a pair of parallel-spaced axes, it is desirable that the position of the forward end of the cutter bar be known, when under the coal face, to prevent said cutter bar from cutting beyond the desired extent of the mine walls at the sides of the working plate. While the position of the cutter bar may be estimated at times, such estimates are not always accurate or possible without stopping the machine and clearing the cuttings from the forward end thereof. This is particularly true in machines wherein the cutter bar is pivoted about both of these axes by power and is not manually locked from movement about one of these axes during sumping or cutting across the coal face.

The principal objects of my invention are to remedy this condition by providing a device which will indicate the position of the cutter bar with respect to the coal face when sumped under the coal and while being fed across the coal face.

Other objects of my invention will appear from time to time as the following specification proceeds.

My invention may be more clearly understood with reference to the accompanying drawings wherein.

The forms of my invention illustrated in the drawings are shown as being embodied in a track-mounted mining machine of the bottom cutting type. Said machine is of a construction similar to that shown in a prior application, Serial No. 749,345, filed by me on October 22, 1934, and is only herein illustrated insofar as is necessary to clearly disclose my present invention.

Said mining machine includes a track-mounted truck 10 which forms a base for a turntable 11 which is pivotally mounted thereon adjacent the forward end thereof. Said turntable forms a support means for a cutting element 12 which includes a motor 13 having a cutter frame 14 secured thereto and extending forwardly therefrom beyond the forward end of said truck and turntable. Said cutter frame is mounted on said turntable on a pair of trunnion supports 15, 15 for pivotal movement with respect to said turntable about a transverse axis to form a means for adjusting the angle of the cutting mechanism with respect to the mine floor.

A frame 16 is supported by the cutter frame 14 for slidable movement with respect thereto in a pair of parallel-spaced guides, generally indicated by reference characters 17, 17, and said frame is adjustably moved toward or from said cutter frame by means of a suitable threaded shaft interposed between said frames and threaded within the hub of a worm gear 18 which in turn is selectively driven from the motor 13 by means of a suitable gear train of a usual construction which will not herein be shown or described in detail since it is no portion of my present invention.

The frame 16 forms a pivotal support for a cutter head 19 which is mounted therein for pivotal movement with respect thereto about an axis parallel to the axis of pivotal movement of said turntable. A cutter bar 20 having a cutter chain 21 movable thereabout is supported by said cutter head and extends forwardly therefrom. Said cutter chain is driven from the motor 13 by means of a suitable gear train of a usual construction and generally indicated by reference character 22, but not herein shown or described in detail since it is no portion of my present invention.

The means for swinging the cutter bar 20 about the axis of pivotal connection of the cutter head 19 to the frame 16 at either a high positioning speed or a low feeding speed, as herein shown, includes a spur gear 23 mounted on the cutter head 19. Said spur gear is meshed with and driven by a spur pinion 24 journaled in the frame 16 and engaged by a splined shaft 25. The upper end of said splined shaft slidably engages a splined sleeve 26 driven by a worm gear 27.

The worm gear 27 meshes with and is driven by a worm 29 on the forward end of a shaft 30 extending longitudinally of the cutter frame 14 and journaled therein. The pitch of said worm and worm gear is such that said cutter bar will be locked from pivotal movement except when the shaft 30 is driven by the motor. A spur gear 31 is freely mounted on said shaft adjacent the rearward end thereof. Said spur gear is adapted to be operatively connected with said shaft by suitable clutch mechanism on one end of a clutch member 32 in a usual manner. Said spur gear also forms a drive member for change speed gearing, generally indicated by reference character 33, so that said shaft may be driven at a reduced feeding speed by means of suitable clutch mechanism on the opposite end of said clutch member 32 from said first-mentioned clutch mechanism.

A bevel gear 34 is freely mounted on the shaft 30 and journaled in the cutter frame 14 rearwardly of the spur gear 31 and is driven from a bevel pinion 35 on the outer end of a transverse shaft 36. A bevel gear 37 is keyed on the opposite end of said transverse shaft and is adapted to be meshed with a pair of opposing bevel gears 38, 38 mounted coaxially with a longitudinally extending shaft 39. Either of said bevel gears may be operatively connected with said longitudinal shaft for driving the transverse shaft 36 in reverse directions without reversal of the motor 13 by means of suitable clutch mechanism, generally indicated by reference character 40. Said clutch mechanism may be of any type well known to those skilled in the art, and is not herein shown in detail since it is no portion of my present invention.

The longitudinally extending shaft 39 is driven from the motor 13 by means of a gear train, generally indicated by reference character 41.

Figure 3:
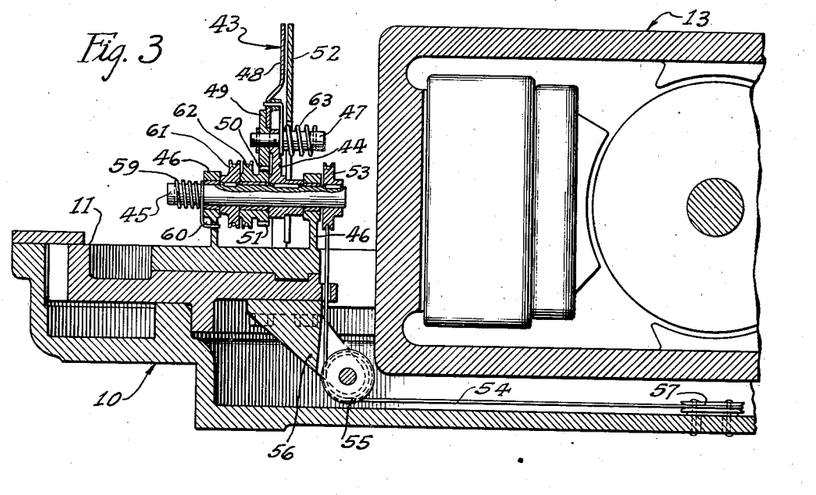
Figure 3 is an enlarged fragmentary sectional view taken substantially along line 3—3 of Figure 2.
Figures 4, 5:
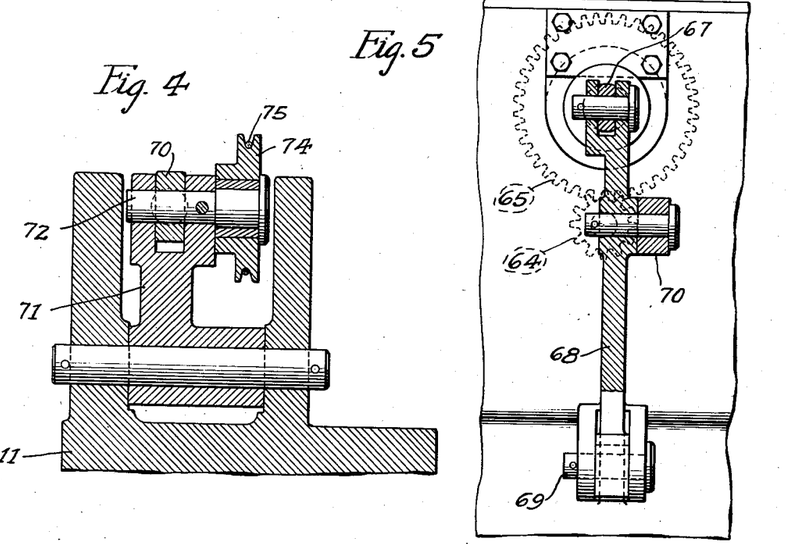
Figure 4 is an enlarged fragmentary sectional view taken substantially along line 4—4 of Figure 2.
Figure 5 is an enlarged fragmentary sectional view taken substantially along line 5—5 of Figure 2.

Referring now particularly to the novel means for indicating the position of the forward end of the cutter bar 20 with respect to the coal face when sumped under the coal face and being pivotally moved by power about either or both of its parallel pivotal axes, an indicating arm 43 is herein shown as being provided on one side of the turntable 11 adjacent the motor 13. Said indicating arm is adapted to be operatively connected with the turntable 11 and the cutter bar 20 so as to move about a pair of parallel-spaced axes representing the pivotal axes of said turntable and cutter bar upon movement of said cutter bar about said axes. As herein shown, said indicating arm includes a lower portion 44 keyed to a transverse shaft 45 journaled on the turntable 11 in spaced-apart bearing brackets 46, 46 mounted on said turntable (see Figure 3). The lower portion 44 of said indicating arm has a shaft 47 secured thereto adjacent the upper end thereof which forms a pivotal support for an upper portion 48 of said indicating arm which may indicate the position of the cutter bar on a guide plate 52 which is secured to said turntable adjacent said indicating arm. As herein shown, said upper portion is secured to a member 49 which has gear teeth 50 cut in the lower portion of the outer face thereof and which is mounted for pivotal movement about the shaft 47. Said gear teeth mesh with a spur gear 51 freely mounted on the transverse shaft 45.

Figure 1:
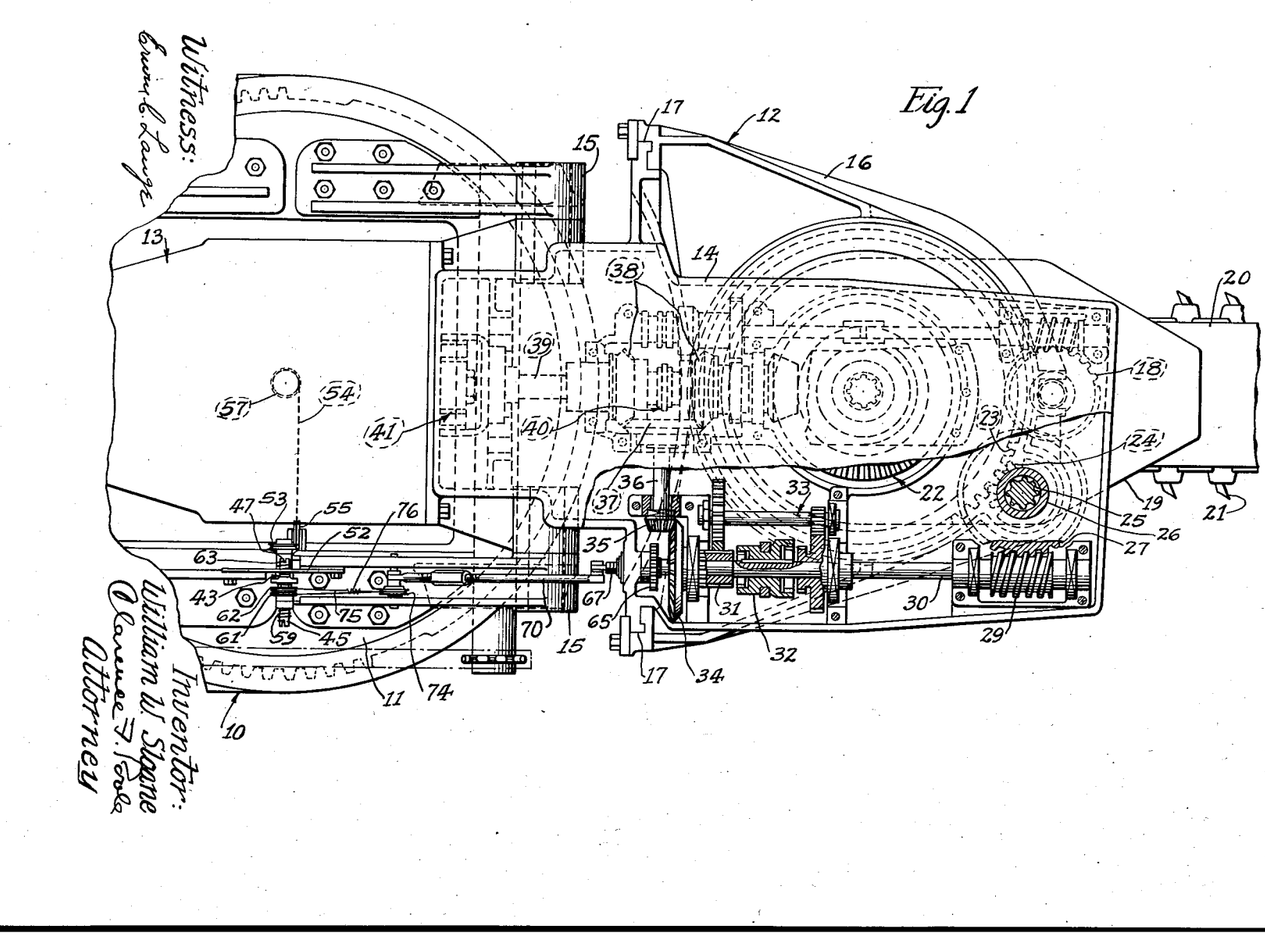
Figure 1 is a top plan view of the forward portion of a track-mounted mining machine of the bottom cutting type illustrating one form in which my invention may be embodied and with certain parts broken away and shown in horizontal section to more clearly illustrate certain details of my invention.
Figure 2:
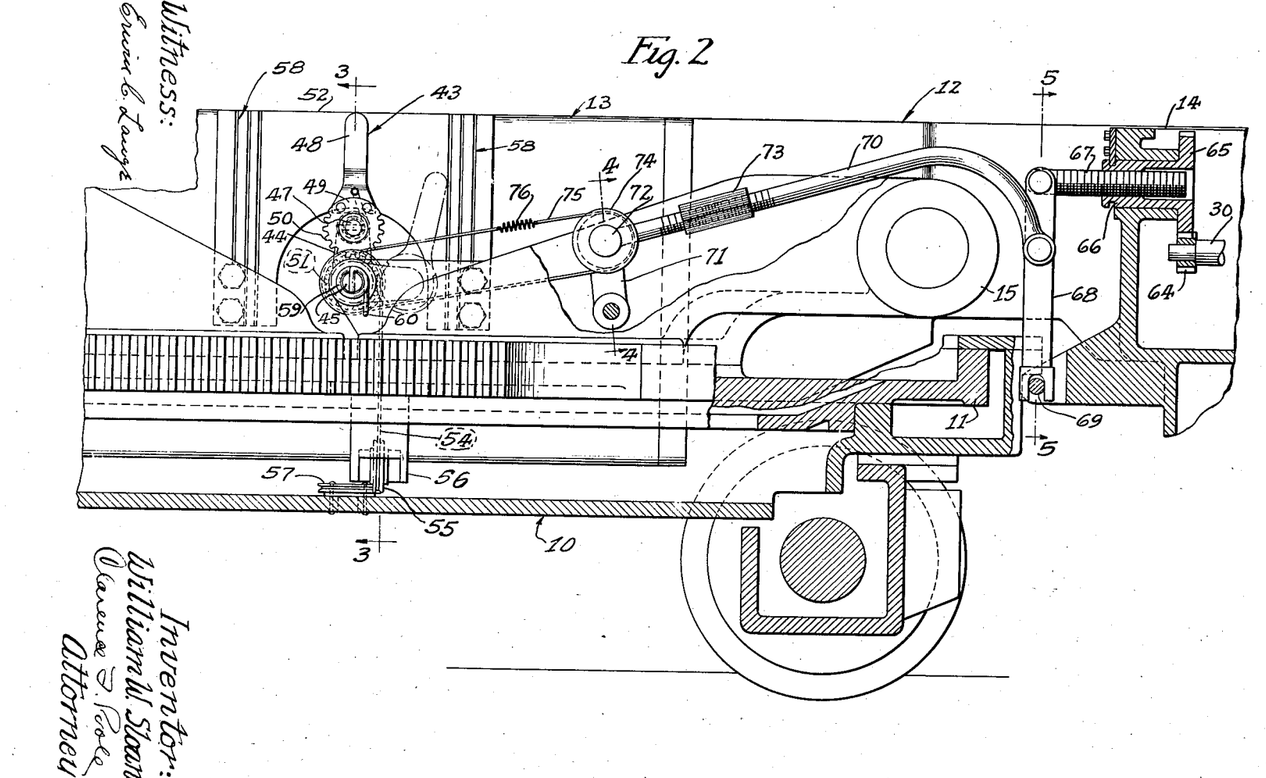
Figure 2 is an enlarged fragmentary side elevation of a portion of the device shown in Figure 1, with certain parts broken away and shown in vertical section to more clearly illustrate certain details of my invention.

With reference to Figure 2, it will be noted that the guide plate 52 has a set of vertical lines, generally indicated by reference character 58, on each side thereof and spaced equally from the center of the shaft 45 which supports the indicating arm 43. These lines represent the widths of average working places. When the track is in the center of the working place and the cutter bar is positioned to sump along one side wall thereof, the upper end of said indicating arm will be positioned adjacent one of the lines 58 depending upon the width of place to be cut. Said indicating arm will move across the guide plate and when its upper end is adjacent the opposite line 58 representing the opposite mine wall, the forward end of the cutter bar will be disposed adjacent said wall. It should be understood that additional lines representing other widths of working places may readily be placed on this plate. These lines may also be arranged to accurately indicate the position of the cutter bar with respect to the working place where the tracks are not in the center of the room by placing the lines at distances from the center of the shaft 45 proportionate to the distances of the mine walls from the center of the track.

Flexible means are provided for pivotally moving the shaft 45 upon turning movement of the turntable which include a sheave 53 keyed on the inner end of the transverse shaft 45. Said sheave has a flexible cable 54 secured thereto and wound thereon. Said cable is trained downwardly from said sheave and around a sheave 55 mounted in a bracket 56, depending from said turntable, for rotation about an axis perpendicular to the axis of rotation of the sheave 53. From thence said cable extends inwardly toward the center of the turntable and is secured to and trained around a sheave 57 secured to the frame for the truck 10 coaxial with the pivotal axis of the turntable 11.

It will be apparent that upon turning movement of the turntable in one direction, that the flexible cable 54 will wind around the sheave 57 which will cause said cable to unwind from the sheave 53 and rotate said sheave and the lower portion 44 of the indicating arm 43. Suitable means are provided to wind the flexible cable 54 on the sheave 53 when the turntable is turning in an opposite direction which, as herein shown, comprises a coil spring 59 encircling the outer end of the transverse shaft 45. Said coil spring has one end secured to said transverse shaft and an opposite end 60 abutting the outer bearing bracket 46 and extending through a suitable hole formed therein.

Suitable means are provided for causing the upper portion 48 of the indicating arm 43 to move with the lower portion of said indicating arm upon turning movement of the turntable 11, when the cutter bar 20 is stationary with respect to said turntable. Said means as herein shown includes a sheave 61 keyed on the transverse shaft 45. Said sheave is operably connected with a sheave 62 freely mounted on said shaft and herein shown as being formed integral with the spur gear 51. The arrangement is such that said first-mentioned sheave may rotate said last-named sheave and spur gear at the speed of rotation of said shaft against a spring 63 encircling the shaft 47 in a manner which will hereinafter more clearly appear as this specification proceeds. Said spring is secured to said shaft at one of its ends and its opposite end engages the upper portion 48 of said indicating arm. Said spring tends to pivot the upper portion of said indicating arm about the axis of the shaft 47 and also serves to move the upper and lower portions of said indicating arm as a unit when the cutter bar is stationary with respect to the turntable and the turntable is turning in a direction to unwind cable from the sheave 61.

Means driven by the shaft 30 are provided for pivotally moving the indicating arm 43 upon swinging movement of the cutter bar about its axis of pivotal connection to the frame 16 in one direction. When said cutter bar is swinging in an opposite direction, said indicating arm is pivoted about the axis of the shaft 47 by means of the spring 63 controlled by said last-mentioned means. Said means, as herein shown, includes a spur pinion 64 keyed on the rearward end of the longitudinal shaft 30 which meshes with and drives a spur gear 65 journaled in the frame 14. Said spur gear is provided with an internal threaded hub 66 and is journaled on its hub in said frame member. A threaded shaft 67 is threaded within the threaded hub 66 and has pivotal connection at its rearward end with a rocking member 68. The lower end of said rocking member is forked and has pivotal engagement with a pin 69 so that movement of said threaded shaft with respect to said frame will cause rocking movement of said rocking member about the axis of said pin.

A connecting member 70 is pivoted to the rocking member 68 intermediate the ends thereof and extends upwardly and rearwardly therefrom over the right hand trunnion support 15 toward the rearward portion of the machine. Said connecting member is pivotally connected at its rearward end to a forked rocking member 71 by means of a pivotal pin 72. Said connecting member, as herein shown, is made of two parts connected together by a threaded adjusting nut 73 for varying the distance between the ends of said member and forming a means to adjust the mechanism to compensate for wearing of the parts thereof.

A sheave 74 is journaled on the pivotal pin 72. Said sheave is adapted to have a flexible cable 75 trained therearound. Said cable extends from the sheave 61 to which it is secured at one of its ends, around the sheave 74 to the sheave 62 to which it is secured at its opposite end and has a tension spring 76 connected therein to prevent breakage of the parts in cases where the indicating arm might strike an obstruction on the machine.

It will now be seen that when the cutter bar is pivoted by power about its axis of pivotal connection to the frame 16 that a drive connection from the shaft 30 will rock the rocking members 68 and 71. When said rocking members are moving in a direction toward the forward end of the machine, the sheave 62 will be rotated by the flexible cable 75 which will drive the gear 51 and in turn pivot the indicating arm 43 about the axis of the shaft 47 against the spring 63. When said cutter bar is pivoted in an opposite direction, said rocking member will be moved towards the rearward end of the machine which will permit the spring 63 to pivot the upper portion 48 of the indicating arm 43 in the direction of movement of the cutter bar under control of the sheave 61 and wind cable on the sheave 62.

It should be noted that inasmuch as the flexible cable 75 is wound on and connected to the sheaves 61 and 62 at its ends, that when the turntable is turned in a direction to wind cable on the sheave 61 and the cutter bar is simultaneously moved about its axis of pivotal connection to the frame 16 in the same direction, that rotation of the sheave 61 will increase the speed of rotation of the sheave 62 an amount sufficient to compensate for turning movement of said turntable, so that said indicating arm will move a distance corresponding to the distance traversed by the outer end of said cutter bar. When said turntable and cutter bar are moved in an opposite direction, cable will be unwound from the sheave 61 and the difference in movement between said turntable and cutter bar will be compensated for by means of the spring 63 which will wind cable on the sheave 62 as it is payed off the sheave 61.

It should also be noted that when the cutter bar is stationary with respect to the frame 16 and the turntable is turning, that the sheave 61 will rotate the sheave 62 and gear 51 at the speed of rotation of the shaft 45 so that the portions 44 and 48 of said indicating arm will move about the axis of the shaft 45 as a unit. The springs 59 and 63 will effect the same result when said turntable is moved in an opposite direction.

Figure 6:
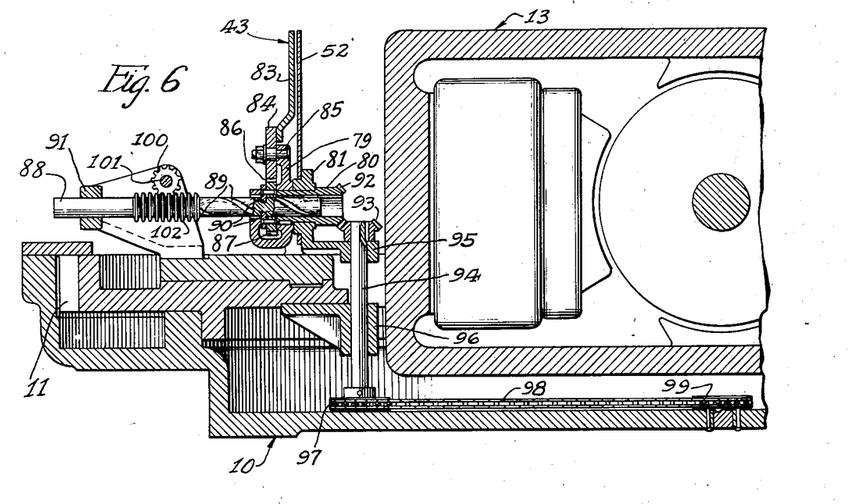
Figure 6 is an enlarged transverse sectional view similar to Figure 3 showing a modified form of my invention.
Figure 7:
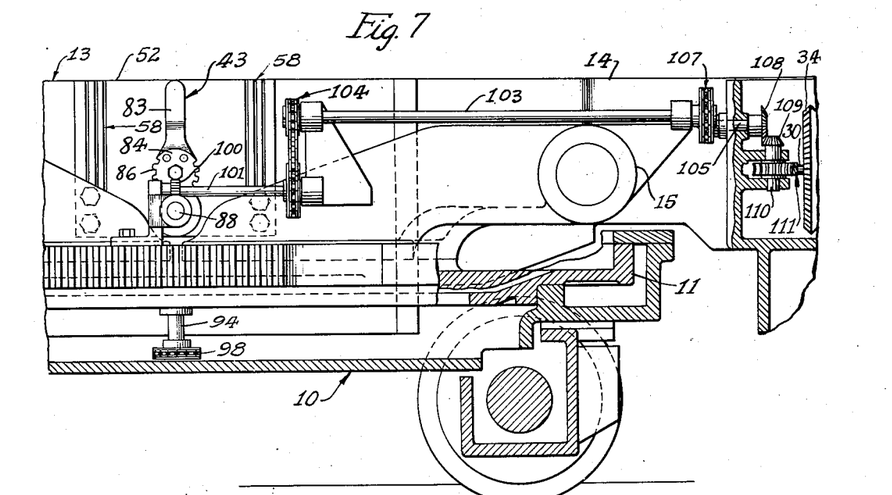
Figure 7 is a side elevation showing certain other details of the modified form of my invention not shown in Figure 6.

Referring now in particular to the modified form of my invention illustrated in Figures 6 and 7, the indicating arm 43 is similar to that shown in Figures 1 to 5, inclusive, and includes a lower portion 79 keyed to a sleeve 80 which sleeve is journaled in a bearing bracket 81 extending upwardly from and mounted on the turntable 11. Said lower portion has a pivotally movable upper indicating portion 83 pivoted thereon which as herein shown is secured to a member 84 pivotally mounted on the shaft 85, which shaft is mounted in and extends outwardly from the upper end of said lower portion of said indicating arm.

Gear teeth 86 are cut integral with the lower portion of the member 84 and are meshed with a spur gear 87. Said spur gear is mounted coaxially with a shaft 88 having a pair of oppositely disposed spiral grooves 89, 89 cut in the outer surface thereof and extending therealong. Said grooves are adapted to be engaged by engaging members 90, 90 secured to the spur gear 87 and extending inwardly therefrom so that translational movement of said shaft will cause rotational movement of said gear. Said shaft is also feathered to the sleeve 80 so that it will rotate with said sleeve, and the outer end of said shaft is slidably mounted in a bearing bracket 91.

The sleeve 80 is rotated by means of a bevel gear 92 cut integral with said sleeve adjacent the inner end thereof and meshing with a bevel gear 93 keyed on the upper end of a vertical shaft 94. Said shaft is journaled adjacent the lower portion of the bevel pinion 93 in an inwardly extending projection 95 from the bearing bracket 81 and in a bearing bracket 96 spaced downwardly therefrom and mounted on the under surface of the turntable 11.

A sprocket 97 is secured to the lower end of the shaft 94 and has an endless chain 98 trained therearound. Said endless chain is also trained around and meshes with a sprocket 99 secured to the frame for the truck 10 coaxial with the axis of rotation of the turntable 11.

Thus rotation of said turntable will cause rotation of the sprocket 97 which in turn will rotate the sleeve 80 at a speed corresponding to the speed of rotation of said turntable and move said lower portion of said indicating arm a distance proportionate to the distance traversed by said turntable. It should be noted that inasmuch as the shaft 88 is feathered to the sleeve 80 that the spur gear 87 rotates with said shaft at a speed of rotation of the sleeve 80 and thus causes the upper and lower portions of said indicating arm to move as a unit about the axis of the shaft 88 in cases where the cutter bar is stationary with respect to the turntable and the turntable is turning.

When the cutter bar is moving with respect to the turntable about its axis of pivotal connection to the frame 16, the shaft 85 is moved translationally through the sleeve 80 to rotate the spur gear 87 and pivot the upper portion 83 of the indicating arm 43 about the axis of the shaft 85. This is accomplished by a spur gear 100 keyed adjacent the rearward end of a shaft 101. Said gear meshes with a series of concentric teeth 102, herein preferably shown as being cut integral with the shaft 85. Said teeth are so cut as to have no lead and thus form in effect rack teeth so that rotation of the spur gear 100 will translationally move the shaft 85 with respect to the turntable and thus rotate the spur gear 87 by means of the spiral grooves 89, 89 in an obvious manner.

The shaft 101 is driven by a longitudinally extending shaft 103 by means of a chain and sprocket drive, generally indicated by reference character 104. The shaft 103 is in turn driven by a shaft 105 by means of a chain and sprocket drive, generally indicated by reference character 107. A bevel gear 108 is keyed on the forward end of the shaft 105 and meshes with and is driven from a bevel pinion 109 on the upper end of a vertical shaft 110. Said vertical shaft 110 is driven from the longitudinal shaft 30 by means of a suitable worm and worm gear drive, generally indicated by reference character 111.

When the cutter bar 20 is pivotally moved by power about the pivotal axis of the cutter head 19 the shaft 85 will be translationally moved with respect to the turntable by power driven mechanism driven from the drive means for pivoting said cutter bar. Translational movement of said shaft will cause rotational movement of the spur gear 87 by means of the spiral grooves 89. This will pivot the upper portion 83 of the indicating arm 43 a distance corresponding to the distance of movement of said cutter bar.

It will be seen that when the turntable is turning and the cutter bar is turning about a parallel-spaced pivotal axis, that turning movement of said turntable will cause rotation of the gear 87 at a speed corresponding to the speed of movement of said turntable and that pivotal movement of said cutter bar about its pivotal axis will increase the speed of movement of the spur gear 87 an amount sufficient to cause the upper portion of said indicating arm to pivot about the axis of the shaft 85 a distance proportionate to the distance traveled by said cutter bar.

Figure 8:
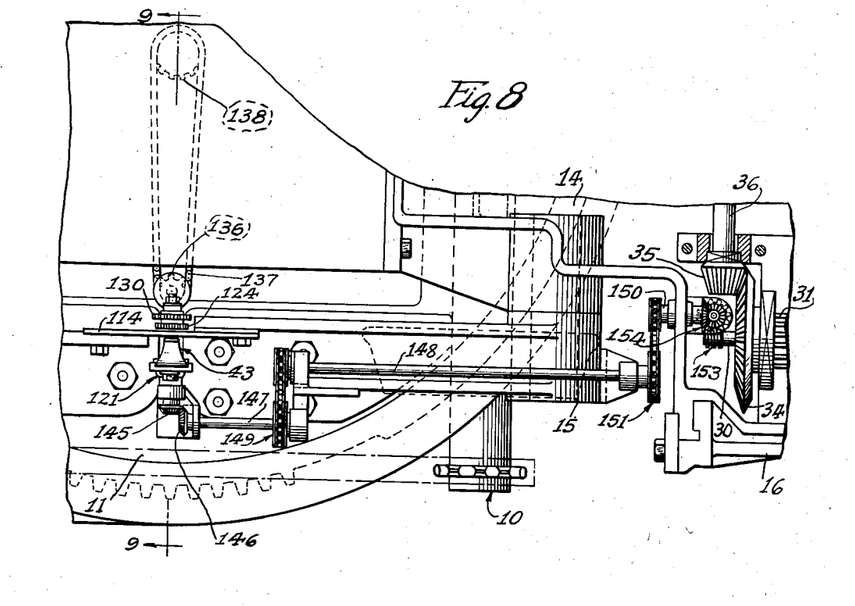
Figure 8 is a partial fragmentary plan view of the forward portion of the machine shown in Figure 1, showing another modified form of my invention.
Figure 9:
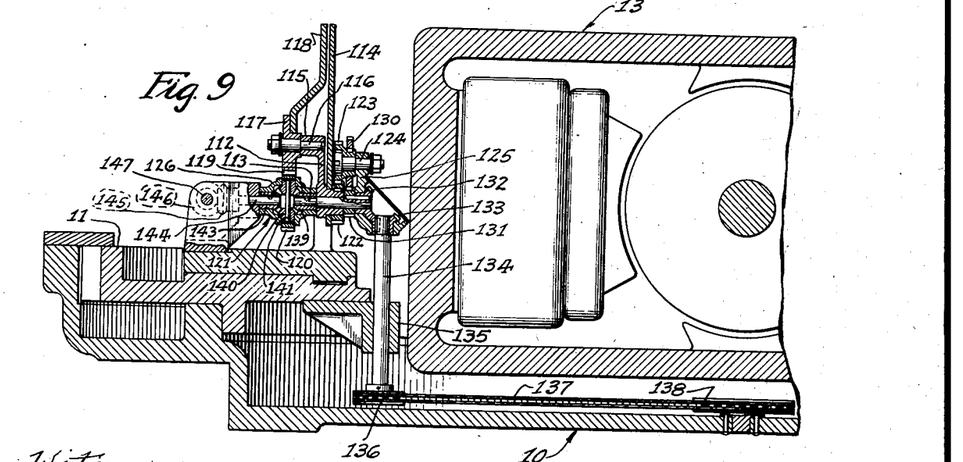
Figure 9 is a fragmentary sectional view taken substantially along line 9—9 of Figure 8.

The form of my invention illustrated in Figures 8 and 9 includes an indicating arm 43 similar to the indicating arm shown in the forms of my invention illustrated in Figures 1 to 7, inclusive. Said indicating arm includes a lower portion 112 mounted for pivotal movement about an axis coaxial with a transverse shaft 113 and journaled on its hub in a suitable bearing bracket extending upwardly from said turntable and formed integral with a guide plate 114. Said lower portion of said indicating arm is provided with a boss 115 adjacent the upper end thereof which extends outwardly therefrom and forms a support for a transverse shaft 116. Said shaft in turn has a member 117 freely mounted thereon which, as herein shown, has an upper indicating portion 118 of said indicating arm secured thereto and extending upwardly therefrom.

Gear teeth 119 are cut integral with the lower portion of the member 117 and mesh with a spur ring gear 120 which is secured to the outside of a casing 126 of a differential, generally indicated by reference character 121.

The lower indicating portion 112 is provided with a hub coaxial with the shaft 113 which has a spur gear 122 keyed thereto. Said spur gear is meshed with a spur gear 123 mounted on a transverse shaft 124 which shaft in turn is mounted on a bearing bracket 125. A spur gear 130 is keyed to the hub of the spur gear 123 and meshes with and is driven from a spur pinion 131 keyed on the transverse shaft 113. A bevel gear 132 is keyed on the inner end of the shaft 113 and is journaled on its hub in the bearing bracket 125. Said bevel gear is meshed with and driven from a bevel gear 133 keyed on the upper end of a vertical shaft 134. Said last-named bevel gear is journaled on its hub on the bearing bracket 125 and said shaft is journaled in a bearing bracket 135 mounted on the under surface of the turntable 11. A sprocket 136 is secured to the lower end of the vertical shaft 134 and is meshed with an endless drive chain 137. Said drive chain is meshed with a sprocket 138 secured to the frame for the truck 10 and disposed coaxial with the center of rotation of said turntable.

In order that the upper portion 118 of said indicating arm may move with the lower portion thereof when the turntable is turned and the cutter bar is stationary with respect thereto, means are provided for rotating the ring gear 120 at the speed of rotation of said lower portion of said indicating arm. Said means, as herein shown, includes a bevel pinion 139 keyed on the inner end of the shaft 113. Said bevel pinion meshes with oppositely disposed bevel pinions 140, 140 mounted on a shaft 141 and journaled on their hubs in the cage 126. Said last-named bevel pinions mesh with a bevel pinion 143 keyed on a transverse shaft 144 and tend to walk around said pinion when stationary.

The upper portion 118 of the indicating arm 43 is pivotally moved about the axis of the shaft 116 at a speed corresponding to the speed of movement of the cutter bar 20 by means of the bevel pinion 143 which meshes with the bevel pinions 140, 140. When the bevel pinion 139 is stationary and the bevel pinion 143 is rotating, rotation thereof will rotate the bevel pinions 140, 140 about the bevel pinion 139 and rotate the cage 126 and ring gear 120. When the turntable is turning simultaneously with turning movement of the cutter bar about an axis parallel to the turning axis of the turntable and in the same direction as said turntable, the pinion will increase the speed of rotation of the cage 126 an amount sufficient to pivot the arm 43 about the axis of the shaft 116 at a speed corresponding to the speed of turning movement of the cutter bar.

The drive connection to the shaft 30 for driving the bevel pinion 143 from said shaft includes a bevel pinion 145 keyed on the outer end of the shaft 144 and meshing with a bevel pinion 146 on the rearward end of a longitudinal shaft 147. Said shaft is driven by a parallel longitudinally extending shaft 148 by means of a chain and sprocket drive 149. A shaft 150 is journaled intermediate its ends in the frame 16 and drives the shaft 148 by means of a chain and sprocket drive 151. Said last-named shaft is driven from the longitudinally extending shaft 30 by means of a worm and worm gear drive, generally indicated by reference character 153, and a set of bevel gears, generally indicated by reference character 154.

It will thus be seen that rotation of the turntable 11 will cause rotation of the indicating arm 43 about the axis of the shaft 113 and that simultaneous pivotal movement of the cutter bar about its axis of pivotal connection to the frame 16 will pivotally move the upper portion 118 of said indicating arm at a speed corresponding to the speed of movement of said cutter bar about the axis of the shaft 117, which axis corresponds to the axis of pivotal movement of said cutter bar. It will also be seen that the means for pivoting said indicating arm about said axes at speeds corresponding to the speeds of movement of said turntable and cutter bar are movable about coaxial axes and include a novel arrangement of differential gearing which is arranged to compensate for difference in movement between said turntable and cutter bar.

While I have herein shown and described a number of forms in which my invention may be embodied, it will be understood that the construction and arrangement of the various parts may be changed or altered without departing from the spirit and scope thereof. Furthermore, I do not wish to be construed as limiting myself to the precise constructions illustrated, excepting as they may be limited in the appended claims.

I claim as my invention:

1. In a mining machine, a cutter bar pivotally movable by power about a pair of parallel-spaced axes, and means for indicating the position of the forward end of said cutter bar with respect to the coal face when said cutter bar is sumped therein and said cutter bar is moved about either of said axes comprising an indicating arm movable about a pair of parallel-spaced axes corresponding to the axes of pivotal movement of said cutter bar, and means for moving said indicating arm about said pivotal axes in the same angular relationship as said cutter bar upon movement of said cutter bar about said corresponding axes.

2. A mining machine in accordance with claim 1, wherein the means for moving the indicating arm about its parallel pivotal axes comprises a shaft coaxial with one of the pivotal axes of said arm and having said arm secured thereto, means connectible with one of the axes of said cutter bar for pivotally moving said shaft and arm upon movement of said cutter bar about said axis, and other means disposed coaxially with said shaft and operable upon movement of said cutter arm about its other pivotal axis for pivotally moving said arm about its second pivotal axis upon movement of said cutter bar about said corresponding axis.

3. A mining machine in accordance with claim 1, wherein the means for moving the indicating arm about its parallel pivotal axes comprises a shaft coaxial with one of the pivotal axes of said arm and having said arm secured thereto, means connectible with one of the axes of said cutter bar for pivotally moving said shaft and arm upon movement of said cutter bar about said axis, and other means disposed coaxially with said shaft and operated by the power means for moving the cutter bar about its other pivotal axis, for pivotally moving said arm about its second pivotal axis upon movement of said cutter bar about said corresponding axis.

4. In a mining machine, a base, a turntable thereon, a cutter bar projecting therefrom and mounted for pivotal movement with respect thereto about an axis spaced from and parallel to the pivotal axis of said turntable, and means for indicating the position of the forward end of said cutter bar with respect to the coal face when said cutter bar is sumped therein and when said cutter bar and turntable are pivotally moved in various positions with respect to each other comprising an indicating arm, means connected between said base and turntable for pivotally moving said indicating arm upon movement of said turntable and other means operable upon turning movement of said cutter bar about an axis parallel to the axis of said turntable for pivotally moving said arm independently of pivotal movement thereof by said turntable.

5. In a mining machine, a base, a turntable thereon, a cutter bar projecting therefrom and mounted for pivotal movement with respect thereto about an axis spaced from and parallel to the pivotal axis of said turntable, and means for indicating the position of the forward end of said cutter bar with respect to the coal face when said cutter bar is sumped therein comprising an indicating arm, means connected between said base and turntable for pivotally moving said indicating arm about one axis upon pivotal movement of said turntable and other means operable upon turning movement of said cutter bar about said axis parallel to the axis of said turntable for pivotally moving said arm about an axis parallel to and spaced from said first-mentioned pivotal axis.

6. In a mining machine, a turntable, a cutter bar projecting therefrom and mounted for pivotal movement with respect thereto about an axis spaced from and parallel to the pivotal axis of said turntable, an indicating arm movable about one axis representing the pivotal axis of said turntable and about a parallel axis representing the pivotal axis of said cutter bar, and means for moving said arm about said axes upon pivotal movement of said cutter bar and turntable for indicating the position of the forward end of said cutter bar with respect to the coal face when sumped thereunder comprising means connectible with said turntable for pivotally moving said arm about said axis representing said pivotal axis of said turntable upon movement of said turntable, and other means connectible with said cutter bar for independently moving said arm about said axis representing said pivotal axis of said cutter bar upon movement of said cutter bar about said last-named axis.

7. In a mining machine, a base, a turntable thereon, a cutter bar projecting therefrom and mounted for pivotal movement with respect thereto about an axis spaced from and parallel to the pivotal axis of said turntable, an indicating arm movable about one axis representing the pivotal axis of said turntable and about a parallel axis representing the pivotal axis of said cutter bar, and means for moving said arm for indicating the position of the forward end of said cutter bar with respect to the coal face when sumped thereunder comprising means connected between said turntable and base for pivotally moving said arm about said axis representing said pivotal axis of said turntable upon movement of said turntable, and other means disposed coaxially with the axis representing the pivotal axis of said turntable and operable upon turning movement of said cutter bar about said axis parallel to the axis of said turntable and for independently moving said arm about the axis representing the pivotal axis of said cutter bar.

8. In a mining machine, a base, a turntable thereon, a cutter bar projecting therefrom and mounted for pivotal movement with respect thereto about an axis spaced from and parallel to the pivotal axis of said turntable, an indicating arm mounted on said turntable for movement about one axis representing the pivotal axis of said turntable and about a parallel axis representing the pivotal axis of said cutter bar, and means for moving said arm about said axes for indicating the position of the forward end of said cutter bar with respect to the coal face when sumped thereunder comprising a pivotally movable shaft having said indicating arm secured thereto and being disposed coaxially with the axis representing the pivotal axis of said turntable and means connected between said turntable and base for rotating said shaft upon movement of said turntable, and other means disposed coaxially with said shaft for independently pivoting said arm about said axis representing said pivotal axis of said cutter bar upon pivotal movement of said cutter bar about an axis parallel to the axis of said turntable.

9. In a mining machine, a base, a turntable thereon, a cutter bar projecting therefrom and mounted for pivotal movement with respect thereto about an axis spaced from and parallel to the pivotal axis of said turntable, an indicating arm mounted on said turntable for movement about one axis representing the pivotal axis of said turntable and about a parallel axis representing the pivotal axis of said cutter bar, and means for moving said arm about said axes for indicating the position of the forward end of said cutter bar with respect to the coal face when sumped thereunder comprising a pivotally movable shaft having said indicating arm secured thereto and being disposed coaxially with the axis representing the pivotal axis of said turntable, means connected between said base and turntable for rotating said shaft upon turning movement of said turntable, other means disposed coaxially with said shaft for independently pivoting said arm about said axis representing the pivotal axis of said cutter bar upon pivotal movement of said cutter bar including a gear freely mounted on said shaft, a connection between said gear and the means for pivoting said cutter bar for rotatably moving said gear upon pivotal movement of said cutter bar, another gear disposed coaxially with the second pivotal axis of said arm and a drive connection between said gears.

10. In a mining machine, a base, a turntable thereon, a cutter bar projecting therefrom and mounted for pivotal movement with respect thereto about an axis spaced from and parallel to the pivotal axis of said turntable, an indicating arm mounted on said turntable for movement about one axis representing the pivotal axis of said turntable and about a parallel axis representing the pivotal axis of said cutter bar, and means for moving said arm about said axes for indicating the position of the forward end of said cutter bar with respect to the coal face when sumped thereunder comprising a pivotally movable shaft having said indicating arm secured thereto and being disposed coaxially with the axis representing the pivotal axis of said turntable, means connected between said base and turntable for rotating said shaft upon movement of said turntable, other means disposed coaxially with said shaft for independently pivoting said arm about said axis representing said pivotal axis of said cutter bar upon pivotal movement of said cutter bar including a gear freely mounted on said shaft, a connection between said gear and the means for pivoting said cutter bar for rotatably moving said gear upon pivotal movement of said cutter bar, another gear disposed coaxially with the pivotal axis of said arm representing the pivotal axis of said cutter bar, said gear being operatively connected with said arm and being meshed with and driven by said first-mentioned gear, and means to prevent pivotal movement of said arm about the axis representing the axis of pivotal movement of the cutter bar when said cutter bar is stationary with respect to said turntable and said turntable is turning comprising an operative connection between said shaft and first-mentioned gear.

11. In an apparatus of the class described, a base, a turntable thereon, a frame projecting forwardly from said turntable and having a projecting cutter bar mounted thereon for pivotal movement about an axis parallel to the axis of movement of said turntable, power means for pivotally moving said cutter bar about said last-named axis, and means for indicating the position of the forward end of said cutter bar with respect to the coal face when said cutter bar is sumped therein comprising an indicating arm mounted on said turntable for movement about a pair of parallel-spaced axes representing the axes of pivotal movement of said turntable and cutter bar, and means for independently moving said arm about said axes comprising a shaft to which said indicating arm is secured, a connection between said base and turntable for rotating said shaft upon turning movement of said turntable, and a drive connection from the power means for pivotally moving said cutter bar about said second axis for moving said indicating arm about its second pivotal axis including a power driven rotatable member mounted on said shaft.

12. In an apparatus of the class described, a base, a turntable thereon, a frame projecting forwardly of said turntable and having a projecting cutter bar mounted thereon for pivotal movement about an axis parallel to the axis of movement of said turntable, power means for pivotally moving said cutter bar about said last-named axis, and means for indicating the position of the forward end of said cutter bar with respect to the coal face when said cutter bar is sumped therein comprising an indicating arm mounted for movement about a pair of parallel-spaced axes corresponding to the axes of pivotal movement of said turntable and cutter bar, and means for independently moving said arm about said axes comprising a shaft to which said indicating arm is secured, a connection between said base and turntable for rotating said shaft upon turning movement of said turntable, a drive connection from the power means for pivoting said cutter bar about said second axis for moving said indicating arm about its second pivotal axis including a power driven rotatable member mounted on said shaft, and means to prevent movement of said arm about its second axis when said cutter arm is stationary with respect to said turntable and said turntable is turning including a member rotatable with said shaft and an operative connection between said member and power driven rotatable member for rotating said power driven rotatable member a distance sufficient to compensate for pivotal movement of said indicating arm about the axis of said shaft.

13. In an apparatus of the class described, a turntable, a frame projecting forwardly from said turntable and having a projecting cutter bar mounted thereon for pivotal movement about an axis parallel to the axis of movement of said turntable, power means for pivotally moving said cutter bar about said last-named axis, and means for indicating the position of the forward end of said cutter bar with respect to the coal face when said cutter bar is sumped therein comprising an indicating arm mounted for movement about a pair of parallel-spaced axes representing the axes of pivotal movement of said turntable and cutter bar, means for independently moving said arm about said axes comprising a shaft to which said indicating arm is secured, a drive connection to said shaft for rotating said shaft upon turning movement of said turntable, and a connection from the power means for pivotally moving said cutter bar about said second axis for moving said indicating arm about its second pivotal axis including a gear mounted on said shaft, a drive connection to said gear, another gear meshed with said gear and disposed coaxially with the second pivotal axis of said indicating arm and having connection with said arm, and means to prevent movement of said arm about its second axis when said turntable is turning and said cutter bar is stationary with respect thereto comprising a drive member rotated by said shaft and a drive connection between said member and gear for rotating said gear at the speed of rotation of said shaft.

14. In an apparatus of the class described, a base, a turntable thereon, a frame projecting forwardly from said turntable and having a projecting cutter bar mounted thereon for pivotal movement about an axis parallel to the axis of movement of said turntable, power means for pivotally moving said cutter bar about said last-named axis, and means for indicating the position of the forward end of said cutter bar with respect to the coal face when said cutter bar is sumped therein comprising an indicating arm mounted for movement about a pair of parallel-spaced axes representing the axes of pivotal movement of said turntable and cutter bar, and means for independently moving said arm about said axes comprising a shaft journaled on said turntable and having said indicating arm secured thereto, flexible drive means connected between said base and turntable for rotating said shaft upon turning movement of said turntable, and a drive connection from the means for pivoting said cutter bar about its axis of pivotal connection to said frame for moving said arm about said second axis including a gear journaled in said frame, another gear freely mounted on said shaft, a drive connection from said last-named gear to said indicating arm, and a drive connection from said first-mentioned gear to said second-mentioned gear for moving said indicating arm about said second axis a distance corresponding to the movement of said cutter bar about its axis of pivotal connection to said frame.

15. In an apparatus of the class described, a turntable, a frame projecting forwardly from said turntable and having a projecting cutter bar mounted thereon for pivotal movement about an axis parallel to the axis of movement of said turntable, and power means for pivotally moving said cutter bar about said last-named axis, and means for indicating the position of the forward end of said cutter bar with respect to the coal face when said cutter bar is sumped therein comprising an indicating arm mounted for movement about a pair of parallel-spaced axes representing the axes of pivotal movement of said turntable and cutter bar, and means for independently moving said arm about said axes comprising a shaft journaled on said turntable and having said indicating arm secured thereto, flexible drive means for rotating said shaft upon turning movement of said turntable, and means driven from the power means for pivoting said cutter bar about its axis of pivotal connection to said frame for moving said arm about said second axis including a gear journaled in said frame, another gear freely mounted on said shaft, a drive connection from said last-named gear to said indicating arm, and a flexible drive connection from said first-mentioned gear to said second-mentioned gear for moving said indicating arm about said second axis a distance corresponding to the movement of said cutter bar about its axis of pivotal connection to said frame.

16. In an apparatus of the class described, a turntable, a frame projecting forwardly from said turntable and having a projecting cutter bar mounted thereon for pivotal movement about an axis parallel to the axis of movement of said turntable, and power means for pivotally moving said cutter bar about said last-named axis, and means for indicating the position of the forward end of said cutter bar with respect to the coal face when said cutter bar is sumped therein comprising an indicating arm mounted for movement about a pair of parallel-spaced axes representing the axes of pivotal movement of said turntable and cutter bar, and means for independently moving said arm about said axes comprising a shaft journaled on said turntable and having said indicating arm secured thereto, flexible drive means for rotating said shaft upon turning movement of said turntable, and means driven from the power means for pivoting said cutter bar about its axis of pivotal connection to said frame for moving said arm about said second axis including a gear journaled in said frame, another gear freely mounted on said shaft, a drive connection from said last-named gear to said indicating arm, and a flexible drive connection from said first-mentioned gear to said second-mentioned gear, said flexible drive connection including a member mounted on said shaft and rotatable therewith and a flexible cable connected between said member and said gear for rotating said gear with said shaft at the speed of rotation of said shaft upon turning of said turntable when said cutter bar is stationary with respect to said frame.

17. In an apparatus of the class described, a turntable, a frame projecting forwardly from said turntable and having a projecting cutter bar mounted thereon for pivotal movement about an axis parallel to the axis of movement of said turntable, and power means for pivotally moving said cutter bar about said last-named axis, and means for indicating the position of the forward end of said cutter bar with respect to the coal face when said cutter bar is sumped therein comprising an indicating arm mounted for movement about a pair of parallel-spaced axes representing the axes of pivotal movement of said turntable and cutter bar, and means for independently moving said arm about said axes at distances corresponding to the movement of said turntable and cutter bar comprising a shaft journaled on said turntable and having said indicating arm secured thereto, flexible drive means for rotating said shaft upon turning movement of said turntable, and a drive connection from the means for pivoting said cutter bar about its axis of pivotal connection to said frame, for moving said arm about said second axis including a gear journaled in said frame, another gear freely mounted on said shaft, a drive connection from said last-named gear to said indicating arm, and a flexible drive connection from said first-mentioned gear to said second-mentioned gear including a connecting member angularly moved by said last-named gear, a sheave on said shaft operatively connectible with said first-named gear, a flexible cable connected with said sheave, a connection between said cable and said angularly movable member for rotatably driving said sheave upon movement of said angularly movable member in one direction and yieldable means for rotatably driving said sheave upon movement of said angularly movable member in an opposite direction.

18. In an apparatus of the class described, a turntable, a frame projecting forwardly from said turntable and having a projecting cutter bar mounted thereon for pivotal movement about an axis parallel to the axis of movement of said turntable, power means for pivotally moving said cutter bar about said last-named axis, and means for indicating the position of the forward end of said cutter bar with respect to the coal face when said cutter bar is sumped therein comprising an indicating arm mounted for movement about a pair of parallel-spaced axes representing the axes of pivotal movement of said turntable and cutter bar, and means for independently moving said arm about said axes comprising a shaft journaled on said turntable and having said indicating arm secured thereto, flexible drive means for rotating said shaft upon turning movement of said turntable, and means driven from the power means for pivoting said cutter bar about its axis of pivotal connection to said frame, for moving said arm about said second axis including a gear journaled in said frame, another gear freely mounted on said shaft, a drive connection from said last-named gear to said indicating arm, and a flexible drive connection from said first-mentioned gear to said second-mentioned gear, said flexible drive connection including a sheave mounted on said shaft and rotatable therewith, another sheave freely mounted on said shaft and having operative connection with said first-named gear, a member threaded within said last-named gear and rectilinearly movable with respect thereto, a sheave connected with said threaded member, and a flexible cable secured at one of its ends to said first-named sheave and at its opposite end to said second-named sheave and trained around said third-named sheave, whereby rectilinear movement of said threaded member in one direction will rotate said gear, and yieldable means for rotating said gear upon movement of said threaded member in an opposite direction.

19. In a mining machine, a base, a turntable on said base, a cutter bar pivotally mounted on said turntable for movement about an axis parallel to the axis of said turntable, and means for indicating the position of the forward end of said cutter bar with respect to the coal face when said cutter bar is sumped therein comprising an indicating arm movable about a pair of parallel-spaced axes corresponding to the axes of pivotal movement of said cutter bar, means for moving said indicating arm about said pivotal axes in the same angular relationship as said cutter bar comprising means connected between said base and turntable for moving said arm about one of said axes upon pivotal movement of said turntable, a shaft coaxial with said last-named axis of pivotal movement of said arm operatively connected with the means for pivotally moving said arm about said axis, said shaft being slidably movable with respect to said arm and having a spiral engaging surface thereon, a gear coaxial with said shaft and mounted for rotation with said shaft, said gear being adapted to engage said spiral engaging surface of said shaft whereby slidable movement of said shaft with respect to said arm will cause rotational movement of said gear, an operative connection between said cutter bar and shaft for slidably moving said shaft upon pivotal movement of said cutter bar about its other pivotal axis, and a connection between said gear and indicating arm for pivotally moving said arm about its other pivotal axis in the same angular relationship as said cutter bar.

20. In a mining machine, a base, a turntable on said base, a cutter bar pivotally mounted on said turntable for movement about an axis parallel to the axis of said turntable, means for indicating the position of the forward end of said cutter bar with respect to the coal face when said cutter bar is sumped therein comprising an indicating arm movable about a pair of parallel-spaced axes corresponding to the axes of pivotal movement of said cutter bar, and means for moving said indicating arm about said pivotal axes in the same angular relationship as said cutter bar comprising a sleeve coaxial with one of the pivotal axes of said arm and having said arm secured thereto, a drive connection between said base and turntable for rotating said sleeve upon rotation of said turntable, a shaft coaxial with and movable translationally of said sleeve, said shaft being rotated by said sleeve and having a spiral groove formed therein, a gear coaxial with said shaft and rotated thereby, said gear having operative connection with said spiral groove so that translational movement of said shaft will rotate said gear, another gear meshed with said first-mentioned gear, and a connection from said gear to said indicating arm for pivotally moving said arm about said other pivotal axis upon movement of said shaft through said sleeve.

21. In a mining machine, a turntable, a cutter bar projecting therefrom and mounted for pivotal movement with respect thereto about an axis spaced from and parallel to the pivotal axis of said turntable, and means for indicating the position of the forward end of said cutter bar with respect to the coal face when said cutter bar is sumped therein comprising an indicating arm, means operated by said turntable for pivotally moving said indicating arm about one axis upon turning movement of said turntable and other means connected with said cutter bar for pivotally moving said arm about an axis parallel to and spaced from said first-mentioned pivotal axis upon pivotal movement of said cutter bar about its axis of pivotal connection to said turntable comprising differential drive gearing having operative connection with the said indicating arm, said drive gearing being driven by the means for pivoting said arm about said first axis and with the means for pivotally moving said cutter bar.

22. In a mining machine, a turntable, a cutter bar projecting therefrom and mounted for pivotal movement with respect thereto about an axis spaced from and parallel to the pivotal axis of said turntable, and means for indicating the position of the forward end of said cutter bar with respect to the coal face when said cutter bar is sumped therein comprising an indicating arm, means operated by said turntable for pivotally moving said indicating arm about one axis upon turning movement of said turntable, and other means connected with said cutter bar for pivotally moving said arm about an axis parallel to and spaced from said first-mentioned pivotal axis upon pivotal movement of said cutter bar about its axis of pivotal connection to said turntable including a cage having a gear driven thereby, a pair of bevel pinions journaled in said cage, a bevel pinion driven by the means for pivoting said arm about said first-mentioned axis meshing with said pinions and another bevel pinion driven by the means for turning said cutter bar, whereby rotation of said last-mentioned pinion will rotate said cage and gear and pivot said arm about said second parallel axis in the same angular relationship as said cutter bar when said turntable is stationary or turning.

WILLIAM W. SLOANE.